United States Patent [19]

Hohn

[11] 4,428,254

[45] Jan. 31, 1984

[54] PLANETARY TRANSMISSION

[75] Inventor: Bernd-Robert Hohn, Kosching, Fed. Rep. of Germany

[73] Assignee: Audi NSU Auto Union AG, Ingolstadt, Fed. Rep. of Germany

[21] Appl. No.: 192,039

[22] Filed: Sep. 29, 1980

[30] Foreign Application Priority Data

Sep. 29, 1979 [DE] Fed. Rep. of Germany ....... 2939623

[51] Int. Cl.$^3$ ............................................ F16H 57/10
[52] U.S. Cl. ...................................... 74/765; 74/753; 74/764; 74/411
[58] Field of Search ................ 74/764, 765, 762, 763, 74/753, 411

[56] References Cited

U.S. PATENT DOCUMENTS

| | | | |
|---|---|---|---|
| 1,717,097 | 6/1929 | Normanville | 74/765 |
| 2,354,257 | 7/1944 | Greenlee | 74/272 |
| 2,877,668 | 3/1959 | Kelbel | 74/788 |
| 3,234,821 | 2/1966 | Himmel et al. | 74/760 |
| 3,475,992 | 11/1969 | West, Jr. et al. | 74/765 x |
| 3,956,946 | 5/1976 | Murakami et al. | 74/753 X |
| 3,999,448 | 12/1976 | Murakami et al. | 74/753 X |
| 4,027,551 | 6/1977 | Murakami et al. | 74/753 X |
| 4,027,552 | 6/1977 | Murakami et al. | 74/753 X |

FOREIGN PATENT DOCUMENTS

| | | |
|---|---|---|
| 1153583 | 8/1963 | Fed. Rep. of Germany . |
| 1213689 | 3/1966 | Fed. Rep. of Germany . |
| 1218244 | 6/1966 | Fed. Rep. of Germany . |
| 2065398 | 8/1973 | Fed. Rep. of Germany ........ 74/753 |
| 1505723 | 7/1974 | Fed. Rep. of Germany . |
| 2721719 | 12/1977 | Fed. Rep. of Germany . |
| 2749137 | 5/1978 | Fed. Rep. of Germany . |
| 2756144 | 6/1978 | Fed. Rep. of Germany . |
| 1041278 | 5/1953 | France ................................. 74/764 |
| 1326058 | 3/1963 | France . |
| 519665 | 4/1972 | Switzerland . |
| 594950 | 12/1947 | United Kingdom . |
| 598806 | 3/1948 | United Kingdom . |
| 704428 | 2/1954 | United Kingdom . |
| 729408 | 5/1955 | United Kingdom . |
| 793616 | 4/1958 | United Kingdom . |
| 977582 | 12/1964 | United Kingdom . |

Primary Examiner—Lawrence J. Staab
Assistant Examiner—Joseph M. Rolrucki
Attorney, Agent, or Firm—Cushman, Darby & Cushman

[57] ABSTRACT

A transmission comprises a rotatable output; a rotatable input; three planetary gear sets each having rotatable first, second and third elements and planet gears; rigid rotatable couplings connecting the second element of each set with one element of one other set and connecting the third element of each set with a different element of one other set, the remaining elements of each set being uncoupled and being of the same kind; a brake for locking each coupling against rotation; the uncoupled element of one set being driven by the input and the uncoupled element of a second set driving the output; and a clutch arrangement for selectively connecting the uncoupled element of the third set with either or both of the uncoupled elements of the first and second sets.

10 Claims, 1 Drawing Figure

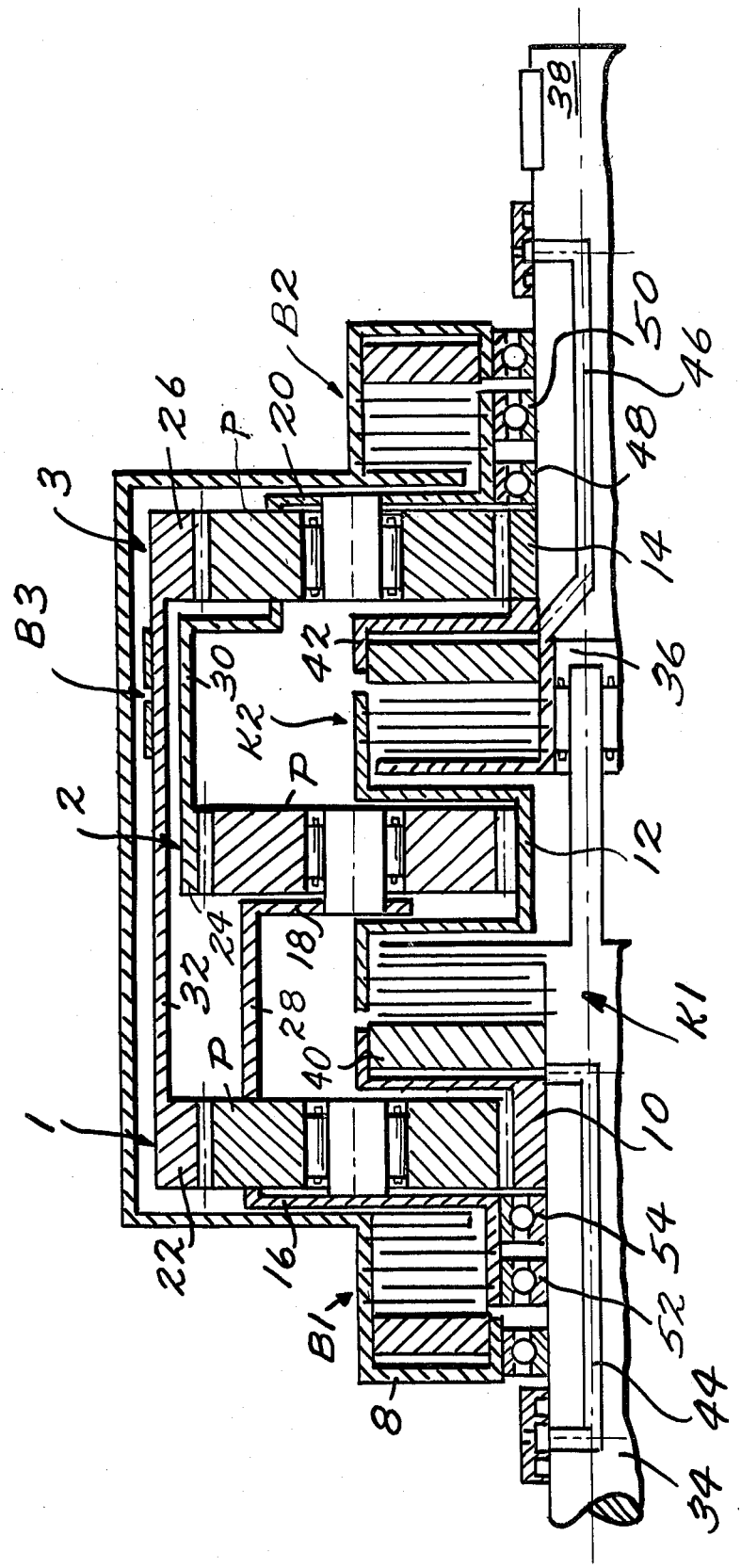

PLANETARY TRANSMISSION

The invention relates to planetary change-gear transmissions, particularly for motorized vehicles.

BACKGROUND AND SUMMARY OF THE INVENTION

German Disclosure Publication 27 21 719 discloses an automotive planetary transmission which includes three interconnected planetary gear sets. The planet carrier of the first gear set is coupled with the ring gear of the second gear set, and the carrier of the second set is coupled with the ring gear of the third set. The sun gear of the second set is coupled with the sun gear of the third set. Six forward gear ratios and one reverse gear can be obtained with the transmission by using two clutches in the coupling system and three brakes.

The two clutched couplings rest in front of the three planet sets whereby the transmission is of relatively long construction. Three hollow shafts resting coaxially in each other are required to connect the clutched couplings with the corresponding members of the planet sets whereby the supply of the pressure medium to the shifting couplings becomes complicated. Also, at least the first planet set must have a relatively large diameter since the sun gear of the first planet set is arranged on the outer hollow shaft and must, therefore, have a correspondingly large diameter; this could possibly result in unfavorable transmission ratios and gear gradations and requires also a radially large space.

It is the object of the invention to design a planetary transmission of the kind disclosed in the German publication in such a fashion that the transmission requires little space with a relatively simple construction and such that up to seven advance gears and one reverse gear can be obtained with favorable transmission ratios and gear gradations with two clutched couplings and three brakes.

Each planet set thus includes one uncoupled rotatable member. While these members can be theoretically the ring gears or the planet gear carriers, it is preferred that the sun gears be the uncoupled members because this arrangement leads to a particularly simple and compact construction of the transmission.

BRIEF DESCRIPTION OF THE DRAWING

The sole FIGURE is a fragmentary schematic view of a transmission according to the invention.

DETAILED DESCRIPTION

The transmission includes three simple planet sets 1, 2 and 3 arranged coaxially one behind another in a transmission case 8. Only the upper half of the transmission is represented, the lower half being the same as the upper half. The planet sets 1, 2 and 3 include, as is conventional, a sun gear 10, 12 or 14, planet gears P, a planet gear carrier 16, 18 or 20 and a ring gear 22, 24 or 26. The various gears are, as is conventional, provided with different numbers of gear teeth in order to obtain desired gear ratios and speed reductions.

The carrier 16 of the planet set 1 is connected to rotate with the carrier 18 of the planet set 2 by means of a rigid coupling 28 in the form of a hollow shaft 28. The ring gear 24 of the planet set 2 is connected to rotate with the carrier 20 of the planet set 3 by means of a hollow coupling shaft 30. The ring gear 22 of the planet set 1 is connected to rotate with the ring gear 26 of the planet set 3 by means of a hollow coupling shaft 32. The shafts 28, 30 and 32 are coaxial with the axis of the transmission.

There are three hydraulically operated brakes B1, B2 and B3 for locking the shafts 28, 30 and 32, respectively, to the transmission case 8. The construction of the brakes may be conventional.

The uncoupled rotatable members of the three planet sets 1, 2 and 3 are the same kind of members, and in the preferred embodiment which is illustrated these uncoupled members are the sun gears 10, 12 and 14. The sun gear 10 of the planet set 1 is secured to a rotary input drive shaft 34 for rotation therewith, as by means of a spline or key. The input shaft 34 extends freely through the sun gear 12 of the planet set 3 and is journalled in a concentric bore hole 36 in the forward end of a power take-off or output shaft 38. The sun gear 14 of the planet set 3 is connected to the output shaft 38 for rotation therewith. The gear 14 and shaft 38 can be constructed as one piece.

A clutch K1 is arranged between the sun gear 10 of the planet set 1 and the sun gear 12 of the planet set 2. A second clutch K2 is arranged between the sun gear 12 and the sun gear 14 of the planet set 3. Thus, the sun gear 12 can be coupled to the input shaft 34 or to the input shaft 38 or to both.

The construction of the clutches K1 and K2 can be conventional. As shown, they are multiple-disc clutches actuated by hydraulic servomotors 40 and 42, respectively, arranged on the shafts 34 and 38 respectively. Pressure fluid for actuating the clutch K1 is supplied through an axial borehole 44 in the input shaft 34. Pressure fluid for actuating the clutch K2 is supplied through an axial borehole 46 in the output shaft 38. The diameters of the clutches K1 and K2 are such that there is sufficient space for them within the hollow coupling shafts 28 and 30, respectively. This feature makes possible a very compact gear arrangement.

The planet set 2 or its ring gear 24 is supported in the transmission case 8 by the coupling shaft 30 and the carrier 20 of the planet set 3. The carrier 20 is journalled on the output shaft 38 at a location within the case 8 by bearings 48 and 50. The carrier 18 of the planet set 2 is supported in the case 8 by the coupling shaft 28 and the carrier 16 of the planet set 1. The carrier 16 is journalled on the input shaft 34 by bearings 52 and 54. The sun gear 12 is not similarly supported and is radially freely adjustable toward its respective planet gears in order to obtain a load balance in connection with the planet set 2. The load balance of the planet sets 1 and 3 is achieved by having their ring gears 22 and 26 supported on the corresponding planet gears without using bearings.

Conventional control means, not shown, may be used for selectively applying pressure fluid to the clutches K1 and K2 and to the brakes B1, B2 and B3.

Up to seven forward speeds and one reverse can be obtained with the transmission, using the clutches K1 and K2 and the brakes B1, B2 and B3. This is illustrated in the following table wherein the symbol x indicates the engagement of a clutch or the locking of a brake:

|          | B1 | B2 | B3 | K1 | K2 |
|----------|----|----|----|----|----|
| 1st gear |    | x  |    | x  |    |
| 2nd gear |    |    | x  | x  |    |
| 3rd gear | x  |    |    |    | x  |
| 4th gear |    | x  |    |    | x  |
| 5th gear |    |    | x  |    | x  |
| 6th gear | x  | x  |    |    |    |

-continued

|  | B1 | B2 | B3 | K1 | K2 |
|---|---|---|---|---|---|
| 7th gear |  |  |  | x | x |
| Reverse gear | x |  |  | x |  |

As can be seen from the schematic drawing, the transmission of the invention has a relatively simple construction requiring little construction space. As there are no hollow shafts directly adjacent the input or output shafts within the area of the planet sets, an uncomplicated supply of pressure medium can be provided to the shifting couplings. Also, radially small planet sets with favorable transmission ratios and gear gradations can be used. The shifting couplings are arranged between the planet sets whereby also axial construction space is saved.

Modifications of the preferred embodiment can be made within the scope of the invention. For example, the coupling between the planet sets 1 and 2 can be applied to the planet sets 2 and 3 and vice versa. It is also possible within the framework of the invention to design the ring gears without coupling instead of the sun wheels as in the preferred embodiment, whereby the ring gears would have to be connected and coupled with the input and output shafts as is done with the sun gears in the exemplified embodiment. In that event the sun gears would have to be coupled, as are the ring gears in the exemplified embodiment.

What is claimed is:

1. A transmission comprising: an input shaft and an output shaft rotatable about a common axis; first, second and third planetary gear sets each having a sun gear, a ring gear coaxial with and rotatable about the sun gear and planetary gear means including planetary gears engaging the sun gear and the ring gear and a planetary carrier supporting said planetary gears; a rigid rotatable first coupling connecting the ring gears of said first and third planetary gear set; a rigid rotatable second coupling connecting the planetary carrier of said first planetary gear set with the planetary carrier of said second planetary gear set; a third coupling connecting the planetary carrier of said third planetary gear set with or said ring gear of said second planetary gear set; a brake means for each coupling; a first clutch means for selectively connecting the sun gear of said second planetary gear set with said input shaft; a second clutch means for selectively connecting said sun gear of said second planetary gear set with said output shaft; the sun gear of said first planetary gear set being rigidly connected with said input shaft and the sun gear of said third planetary gear set being rigidly connected with said output shaft.

2. A transmission as in claim 1, in which said first clutch means is arranged between said first and second planetary gear sets and the other clutch means is arranged between said second and third planetary gear sets, both said clutch means lying within said couplings.

3. A transmission as in claim 2 wherein said clutch means are hydraulically operated, wherein said input shaft includes an axial borehole for transmitting hydraulic pressure to and from said first clutch means, and wherein said output shaft includes an axial borehole for transmitting hydraulic pressure to and from said second clutch means.

4. A transmission as in claim 1 wherein said input shaft passes through said sun gear of said first planetary gear set and is journalled within said output shaft.

5. A transmission as in claim 1 wherein said sun gear of said second planetary gear set is radially adjustable with respect to the corresponding planetary gears of said second planetary gear set.

6. A transmission comprising: an input shaft and an output shaft rotatable about a common axis; first, second and third planetary gear sets each having a sun gear, a ring gear coaxial with and rotatable about the sun gear and planetary gear means including planetary gears engaging the sun gear and the ring gear and a planetary carrier supporting said planetary gears; a rigid rotatable first coupling connecting the ring gears of said first and third planetary gear set; a rigid rotatable second coupling connecting the planetary carrier of said first planetary gear set with the ring gear of said second planetary gear set; a third coupling connecting the planetary carrier of said third planetary gear set with said planetary carrier of said second planetary gear set; a brake means for each coupling; a first clutch means for selectively connecting the sun gear of said second planetary gear set with said input shaft; a second clutch means for selectively connecting said sun gear of said second planetary gear set with said output shaft; the sun gear of said first planetary gear set being rigidly connected with said input shaft and the sun gear of said third planetary gear set being rigidly connected with said output shaft.

7. A transmission as in claim 6, in which said first clutch means is arranged between said first and second planetary gear sets and the other clutch means is arranged between said second and third planetary gear sets, both said clutch means lying within said couplings.

8. A transmission as in claim 7 wherein said clutch means are hydraulically operated, wherein said input shaft includes an axial borehole for transmitting hydraulic pressure to and from said first clutch means, and wherein said output shaft includes an axial borehole for transmitting hydraulic pressure to and from said second clutch means.

9. A transmission as in claim 6 wherein said input shaft passes through said sun gear of said first planetary gear set and is journalled within said output shaft.

10. A transmission as in claim 6 wherein said sun gear of said second planetary gear set is radially adjustable with respect to the corresponding planetary gears of said second planetary gear set.

* * * * *